United States Patent [19]

Kistner

[11] Patent Number: 5,004,159
[45] Date of Patent: Apr. 2, 1991

[54] METHOD AND APPARATUS FOR APPLYING SINGLE OF MULTICOMPONENT MATERIALS

[75] Inventor: Kenneth J. Kistner, Midlothian, Tex.

[73] Assignee: Specified Equipment Systems Company, Inc., Dallas, Tex.

[21] Appl. No.: 296,734

[22] Filed: Jan. 17, 1989

Related U.S. Application Data

[63] Continuation-in-part of Ser. No. 147,880, Jan. 25, 1988.

[51] Int. Cl.⁵ .............................. B05B 7/24; B05B 7/16
[52] U.S. Cl. .................................... 239/337; 239/302; 417/423.3
[58] Field of Search ............................ 222/55, 63, 135; 417/44, 46, 405, 18, 406, 407, 201, 423 R, 556, 437; 239/302, 337, 61, 303, 304, 135, 310, 398; 418/159, 205, 191, 19, 29, 206; 415/207

[56] References Cited

U.S. PATENT DOCUMENTS

| | | | |
|---|---|---|---|
| 2,621,608 | 12/1952 | McIntyre | 417/46 |
| 2,942,787 | 6/1960 | Bok et al. | 239/337 |
| 3,097,764 | 7/1963 | Loeser | 222/63 |
| 4,154,368 | 5/1979 | Gusmer et al. | 222/135 |
| 4,184,808 | 1/1980 | Cobb | 417/405 |
| 4,376,512 | 3/1983 | Kistner | 239/304 |
| 4,682,710 | 7/1987 | Turner, Jr. et al. | 222/63 |
| 4,703,894 | 11/1987 | Fukuta et al. | 239/414 |
| 4,789,100 | 12/1988 | Senf | 239/432 |

FOREIGN PATENT DOCUMENTS 133801 6/1933 Austria.

*Primary Examiner*—Andres Kashnikow
*Assistant Examiner*—Christopher G. Trainor

[57] ABSTRACT

A method and apparatus for metering and pumping a single fluid of any viscosity includes a gear pump for pumping the fluid, the pump having a discharge connected by a hose to a dispenser. A check valve is used to maintain the pressure in the hose when the pump is in its at-rest position. The gear pump need only be operated as necessary to maintain pressure in the hose. Precise metering of the fluid pumped is accomplished by controlling the operation of the gear pump.

7 Claims, 6 Drawing Sheets

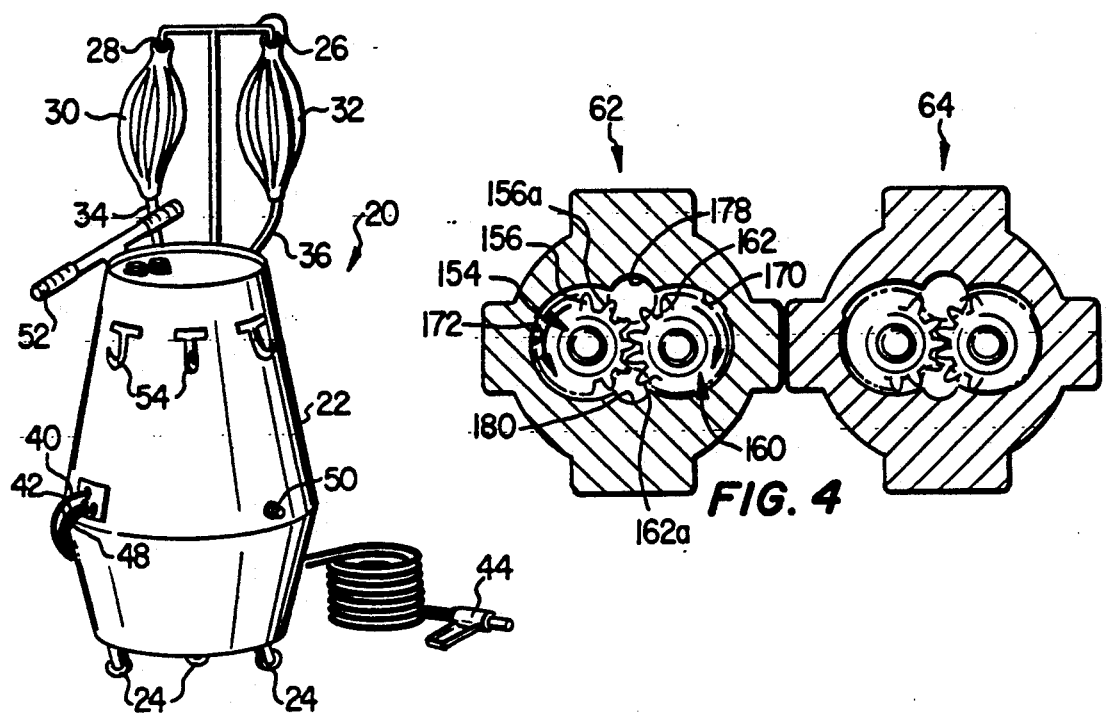
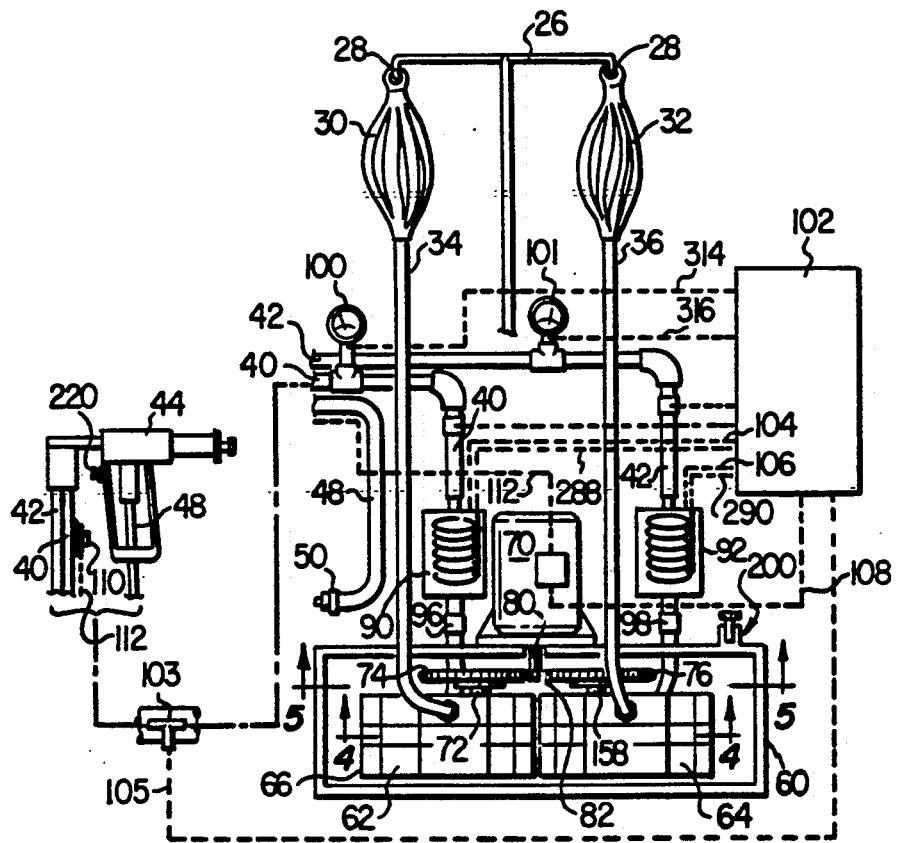
FIG. 1
FIG. 4
FIG. 2

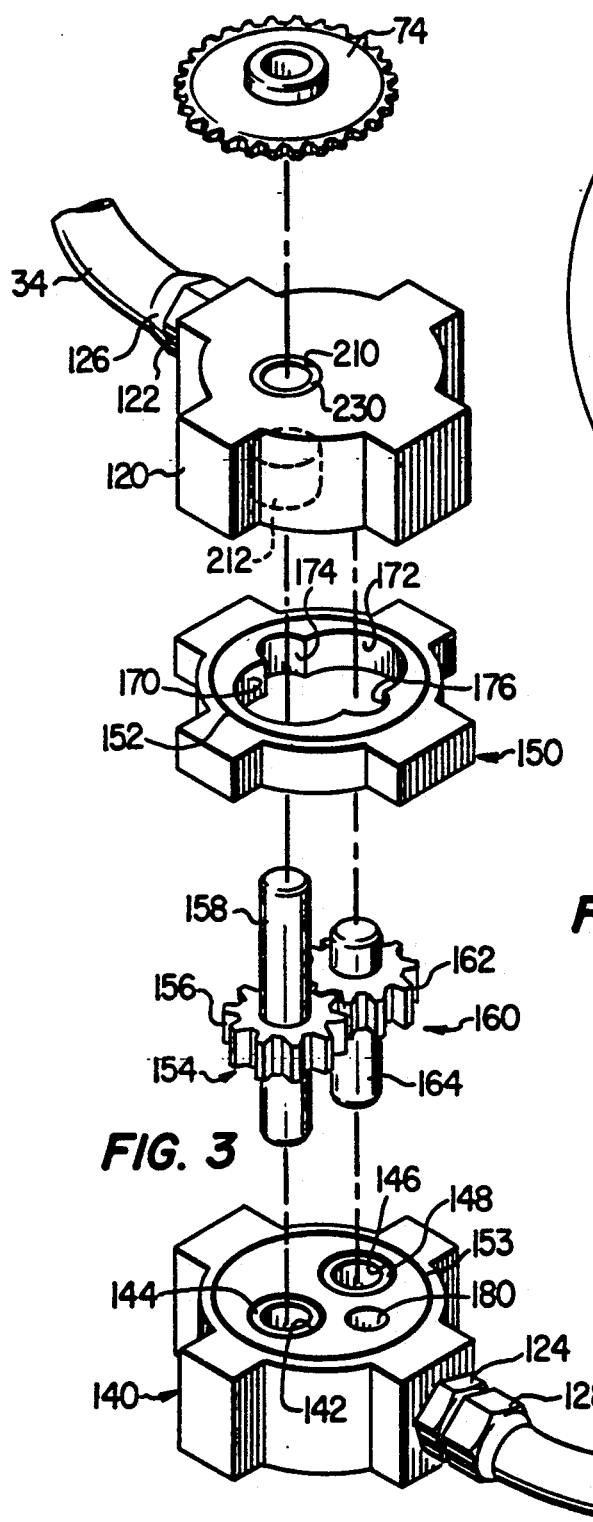
FIG. 3
FIG. 3a
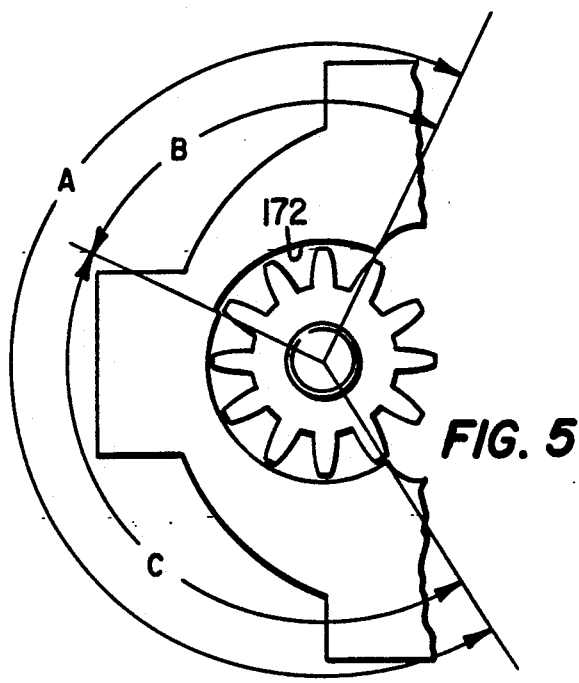
FIG. 5
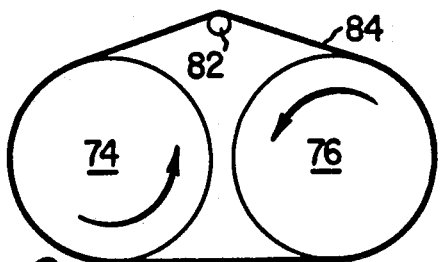
FIG. 6
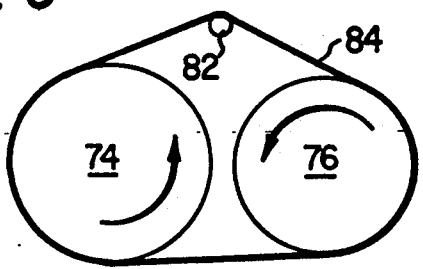
FIG. 7

METHOD AND APPARATUS FOR APPLYING SINGLE OF MULTICOMPONENT MATERIALS

REFERENCE TO RELATED APPLICATION

This application is a continuation-in-part of application Serial No. 147,880, filed Jan. 25, 1988.

BACKGROUND ART

Commercial and other buildings are regularly insulated and waterproofed by applying multicomponent coatings by spraying. As an example, roofs of commercial buildings are waterproofed by applying a polyurethane foam. The polyurethane foam is produced by pumping and spraying desired proportions of polymeric isocyanate and resin components.

In these systems, two or more components having different viscosities must be accurately metered throughout the spraying process. In spraying polyurethane foam, a one to one ratio is normally required. In other multicomponent organic resin sprays, such as for fire retardants and other insulations, a different ratio may be required. Further, these materials, because they must be mixed immediately prior to application to avoid premature reaction, must be very accurately metered and sprayed at precise pressures and temperatures to achieve appropriate atomization of both components and their mixture. If the components are not properly proportioned, the coating may not properly react and may not attain the intended properties.

Heretofore, substantial equipment has been required to accomplish the spraying of these multicomponent coatings and portable units have not existed. In most prior art systems, piston pumps are used for pumping each of the components. These systems are designed for large spray jobs, such as where an entire building roof is to be insulated. While the same systems are also used for small repair jobs, the bulk and size of the equipment makes this undertaking extremely costly.

In the prior systems which use piston pumps, it has been difficult to maintain a proper ratio of one component to the other at all pumping rates and conditions. Further, maintaining equal pressure on both components is difficult. Moreover, these problems are exasperated where small jobs are attempted.

For metering and applying dual component materials, only one system is known which uses gear pumps. This system, disclosed in a patent to the inventor of the present invention, U.S. Pat. No. 4,376,512, uses identical dual gear pumps driven by hydraulic motors connected in series. While this system operates satisfactorily for its intended purpose, it does not achieve the object of the present invention to provide a system which may be designed to easily and accurately proportion two or more different components being pumped.

Apparatus for pumping a single fluid are also in great demand in many industries. Specifically, all applications of a single fluid, whether for purposes of pumping such fluid from one location to another or for applying such fluid to a surface, require a pump capable of accurately and precisely metering material. For example, the application of sealants or the loading of oil or other chemicals into machines or various processes requires a pump system for moving and metering such material. Currently, such materials are normally pumped by use of a piston pump. While such pumps have been acceptable, they have not provided the metering accuracy or control which is desired.

DISCLOSURE OF THE INVENTION

With the limitations of the prior art devices in mind, one embodiment of the present invention provides a method and apparatus for metering and pumping multicomponents of a high viscosity coating material, such as an organic resin coating, and subsequently mixing and applying such mixture onto a surface or into a void. In this embodiment of the invention, the system includes the use of a gear pump for each component. Each gear pump has gears operating in a gear housing for receiving and pumping one of the components. The gear pumps are simultaneously driven at a predetermined speed and each gear pump is designed to pump a predetermined amount of its respective component, at the predetermined speed. In this way, a desired mixture ratio of the components is pumped. The materials are pumped to an applicator, which in one embodiment is a spray gun, for applying the components onto a surface.

In the system of the present invention, flexible hoses connect the pumps to the applicator or spray gun. Check valves are used to maintain the pressure in these hoses when the pumps are in their at-rest positions.

In a further embodiment of the invention, the gear pumps are driven simultaneously by an electric motor. Further, in one embodiment of the invention, the gear pumps may be driven at the same rotational speed but are designed to pump a predetermined amount of the different materials so that the ratio of the materials can be precisely set. For example, where a one to one ratio of isocyanate and resin is required, the gear pumps for pumping these two components may be rotated at the same speed, but because of the different viscosities of the materials, the lead clearances between the gears and the gear housing are different so that equal proportions of the two components are pumped.

Control of the pumps is in the hands of the operator whereby upon actuation of a control at the applicator, the electric motor is operated to instantaneously provide accurately metered amounts of the components. As in conventional units, air pressure may be delivered to the applicator to assist in its actuation.

In accordance with the present invention, the gear pumps are submerged in oil to prevent any contamination of the components, such as the isocyanate or resin, by air which might otherwise enter the system. The gear pumps are aligned such that the rotational axes are positioned vertically. In this way, any air entering the pumps with the component materials will be vented upwardly out of the pumps through bearing seals.

As in conventional systems, the components may be heated as they move from the gear pumps to the applicator.

In a second embodiment of the invention, a method and apparatus are provided for metering and pumping a single component fluid material. In the embodiment, the system uses a gear pump for receiving and pumping the component. In the system, a flexible hose connects the pump to an applicator. A check valve is used to maintain pressure in this hose when the pump is in the at-rest position. By precise control of the movement of the gears in the gear pump, precise metering of the fluid is achieved.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 1 is a perspective view of the pumping and applying apparatus of the present invention;

FIG. 2 is a partially broken away vertical section view showing the interior of the apparatus of FIG. 1;

FIG. 3 is an exploded view of one of the gear pumps used in the present invention;

FIG. 3a is a perspective view of an alternative gear for use in the pump of the present invention;

FIG. 4 is a section view taken along line 4—4 of FIG. 2;

FIG. 5 is an enlargement of a portion of the section view of FIG. 4 showing the clearance between the pump gears and the surround housing in more detail;

FIG. 6 is a section view taken along line 6—6 of FIG. 2 showing the sprocket gearing between the gear pumps and drive motor;

FIG. 7 is a section view taken along line 6—6 of FIG. 2 but showing an alternative gearing;

DESCRIPTION OF THE PREFERRED EMBODIMENT

Figure 8:
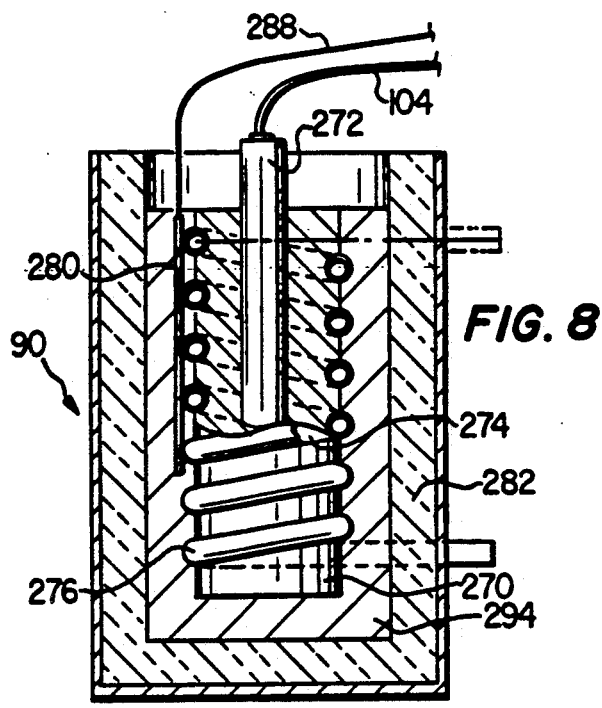
FIG. 8 is an enlarged section view of the heater of the present invention.

Referring now to the drawings and particularly FIG. 1, the present invention includes a multicomponent pumping apparatus 20 consisting of an outer shell 22 supported on rollers 24. Housing 22 has a material support arm 26 having hook ends 28 for supporting collapsible component receptacles 30 and 32. These receptacles are connected to the interior structure within outer shell 22 by hoses 34 and 36, respectively. A pair of material flow hoses 40 and 42 exit housing 22 with spray gun 44 attached to their distal ends. An air line 48 also exits housing 22 and is connected to spray gun 44. An air supply inlet 50 is mounted on housing 22.

A handle assembly 52 is mounted to the top of housing 22, and hose storage J hooks 54 are mounted around the circumference of housing 22 for receiving hoses 40, 42 and 48 for storage.

Referring to FIG. 2 wherein the interior of outer shell 22 is shown, a fluid sealed gear pump chamber 60 is mounted within housing 22 and has a pair of gear pumps 62 and 64 supported therein. Gear pumps 62 and 64 each have an outer housing 66 and 68, respectively, with a drive shaft 158 and 72, respectively, extending therefrom. Sprockets 74 and 76 are mounted on shafts 158 and 72, respectively.

Referring to gear pump 62, hose 34 is connected to the inlet of pump 62 and hose 40 is connected to the outlet. Referring to gear pump 64, hose 36 is connected to the inlet thereof and hose 42 is connected to the outlet. Referring still to FIG. 2, an A-C, 120 volt, 15 amp electric motor 70 is mounted to the top of gear pump chamber 60 and has a drive shaft 80 extending into the housing. As can be seen in FIGS. 2 and 6, drive shaft 80 has an appropriate sprocket 82 which is aligned with sprockets 74 and 76 of gear pumps 62 and 64. A drive chain 84 is entrained around sprockets 74, 76 and 82 such that the operation of electric motor 70 drives gear pumps 62 and 64.

Referring still to FIG. 2, component receptacles 30 and 32 supply material through lines 34 and 36, respectively, to gear pumps 62 and 64, respectively. Where polyurethane foam coatings are sprayed using the present device, one of the receptacles is filled with polymeric isocyanate while the other is filled with an appropriate catalytic resin. An appropriate heater 90 is installed adjacent hose 40 which is connected at its distal end to spray gun 44. Similarly, an appropriate heater 92 is installed adjacent hose 42 which is connected at its distal end to spray gun 44. As is seen in FIG. 2, air inlet coupling 50 is connected to air line 48 which is also connected at its end to spray gun 44.

Hoses 40 and 42 have pressure gauges 100 and 101, respectively, mounted in the line downstream of heaters 90 and 92. Both hoses 40 and 42 have a check valve 96 and 98, respectively, mounted close to the point of connection of these hoses to the gear pumps. These check valves, which are on the pressure side of pumps 62 and 64, permit fluid to be pumped from the gear pumps, but upon cessation of pumping, maintains fluid in hoses 40 and 42 under pressure.

A controller 102 is connected by way of electric leads 104 and 106 to heater assemblies 90 and 92, respectively, and by electric lead 108 to motor 70. Controller 102 is designed to prevent the operation of motor 70, and thus the operation of the system, until the fluid within the lines has reached a predetermined start up temperature and to prevent the operation of the system when the temperature of the fluid in the lines exceeds a predetermined temperature threshold. Such temperature is measured by a sensor 103 mounted on or in hoses 40 and 42 and connected by electrical lead 105 to controller 102. Controller 102 may be one of several units available on the market and in one embodiment of the invention is a digital display, automatic control and monitoring system, MF-1 Series, manufactured by Rika-Kogyo Co., Ltd., Tokyo, Japan.

Motor 70 is controlled by the operator's use of a switch 110 mounted on the hose adjacent to spray gun 44 and connected to motor 70 by electric lead 112.

FIG. 3 shows gear pump 62 in an exploded view. It will be appreciated that gear pump 64 has components similar to those in gear pump 62 although the clearances between the gears and gear housing may be different to accomplish the result described below. FIG. 4 is a section view taken along line 4—4 of FIG. 2, showing a plan section through both gear pumps 62 and 64. FIG. 5 is an enlarged view of the gear and surround housing of gear pump 62.

Referring to FIG. 3 in conjunction with FIGS. 2, 4 and 5, gear pump 62 includes a housing 66 (FIG. 2) with an upper section 120 having an appropriately threaded fitting 122 for receiving threaded end 126 of inlet hose 34. Hose 34 communicates by way of fitting 122 with inlet or suction port 178 (FIG. 4) Housing 66 (FIG. 2) of gear pump 62 also includes a lower section 140 having an appropriately threaded fitting 124 for receiving threaded end 128 of discharge or outlet hose 40. Hose 40 communicates by way of fitting 124 with discharge port 180 (FIG. 3). Lower section 140 includes blind bores 142 and 146 receiving roller bearings 144 and 148 mounted therein. Upper section 120 also includes a bore 210 therethrough with roller bearings 212 and a pressure compensation seal 230 therein. Although not shown in FIG. 3, the underside of upper section 120 also includes a blind bore with roller bearings therein aligned with bore 146 in lower section 140.

A gear housing section 150 is assembled between upper and lower sections 120 and 140. Appropriate seals are used therebetween, such as O-rings 152 and 153, to form a fluid tight seal between the sections when assembled. A drive gear assembly 154 includes a gear section 156 mounted for rotation on a shaft 158. Shaft 158 has its lower end journaled in roller bearing 144 within lower section 140 and its upper end positioned through roller bearing 212 in upper section 120. Sprocket 74 is mounted to the upper end of shaft 158 external of housing 66. A driven gear assembly 160 includes a gear section 162 mounted for rotation with a shaft 164. The upper end of shaft 164 is mounted in a roller bearing in upper section 120 (not shown) and roller bearing 148 in lower section 140. Gear section 162 meshes with gear section 156 and is driven by the rotation of gear section 156.

Gear housing section 150 (FIG. 5) has machined surfaces 170 and 172 which are aligned with gear sections 156 and 162 upon assembly. Gear housing section 150 also has a machined surface 174 which corresponds to the inlet or suction port 178 (FIG. 4), and a machined surface 176 which corresponds with the outlet or pressure port 180. As can be seen in FIG. 4, drive gear assembly 154 rotates in a clockwise direction and driven gear assembly 160 rotates in a counterclockwise direction drawing fluid from the suction port around the gear section to the pressure port 180. The clearance between teeth 156a of gear section 156 and of teeth 162a of gear section 162 and machined surfaces 170 and 172, respectively, adjacent inlet port 178, is slightly greater than that clearance between the teeth and the machined surface near the outlet port. In other words, the clearance between the teeth of gear section 156 and machined surface 170 is slightly greater adjacent to inlet port 178 than it is near the outlet port 180. The same is true for clearances between gear section 162 and machined surface 172. In one embodiment of the invention, the clearance adjacent the inlet port is 0.005 in. (0.0127 cm) while the clearance adjacent the outlet port is 0.003 in. (0.0076 cm). In the present invention, because materials of various viscosities, and in fact materials having substantially different viscosities, are pumped and metered accurately, this clearance between the gear teeth and the corresponding machine surfaces in gear pump 62 may differ from that in gear pump 64. Specifically, precise metering of materials of different viscosities is achieved in the present invention by control of these clearances.

An alternative structure for accomplishing the precise metering of materials of different viscosity and types is shown in FIG. 3a. Specifically, FIG. 3a shows an alternative gear 160' which can be substituted for gear 160 shown in FIG. 3. Gear 160' includes a gear section 162' mounted for rotation with a shaft 164'. In contrast to the gear section 162 of FIG. 3, gear 162' of FIG. 3a includes a plurality of notches 161 which can be varied in width and height to vary the pumping efficiency of the gear section. Thus, by simply varying the dimension of the notches 161, the pumping capacity of the particular gear pump may be varied in relation to the adjacent pump. Similarly, both gears used in the gear pump may incorporate notches or, alternatively, only one gear may be notched, the particular design being dictated by the pumping efficiency required to achieve the appropriate output so that the ratio of material being pumped by the two pumps being used meets the design requirements.

As will be understood by those skilled in the art, other means can be used for varying the pumping efficiency of the gears to accomplish the result taught above. Thus, the height of the gears may be varied, with a lesser height being used to reduce the pumping volume of the particular pump involved. It will be understood that the present invention is intended to encompass all methods of varying the pumping efficiency to accomplish the described objective.

In one embodiment, shown in detail in FIG. 5, the clearance between the gear teeth and the corresponding machined surfaces vary along the confronting surface, indicated by the arc A. The clearance along a sector of arc A, specifically along the arc designated by the letter B, will be greater than the clearance along the remaining sector, designated by the letter C. For example, the clearance between the gear teeth of gear 162 and the corresponding surface 172 along arc B may be 0.005 in. (0.0127 cm) whereas the clearance between the gear teeth and the surface 172 along arc C may be 0.003 in. (0.0076 cm) While the embodiment shown in FIG. 5 illustrates a step from the arc sector B to arc sector C, it will be appreciated that this surface may be a gradual variation without a step at the point of transition. However, it will be appreciated that these clearances will generally be the same for gears 154 and 160 of pump 62 but that the clearances will differ in comparison to those in pump 64 to compensate for the differences in viscosities of the materials being pumped as well as to precisely control the amount of material being pumped from each pump to achieve a desired pumping ratio between the two pumps. This difference is achieved because the pressure produced by the gear pumps is directly proportional to the speed of rotation of the gears, the amount of clearance between the gears and the adjacent surface as well as the overall geometry of the clearance. For example, pump 62 will have a lower pressure where the arc B is longer than in a comparable arrangement where arc B is smaller provided the clearance along arc B is greater than the clearance along arc C.

Thus, where the clearance between the gear teeth and the corresponding machined surface is greater for a longer arc B from the suction port to the pressure port, then a desired pressure reduction for the particular material pumped is induced. Similarly, where this clearance and the arc length of such clearance is reduced, then the pressure rise is increased depending upon the viscosity of the material. Of course, by adjusting the fixed lead arc length and the clearance between the teeth and the corresponding machined surface, gear pumps 62 and 64 may be made to pump the same pressure and volume of material even though the materials have different viscosities and even though the rotation of the pumps are identical.

Thus, in one embodiment of the invention, the clearance between the gear teeth in pump 62 and the corresponding machined surface may be within the range of 0.001 to 0.003 in. (0.0025 cm to 0.0076 cm), while the clearance between the gear teeth of the gears and corresponding machine surfaces for gear pump 64 may be within the range of 0.001 to 0.005 in. (0.0025 cm to 0.0127 cm). This variation may be used to compensate for the differences in viscosities between the isocyanate material and the resin material, or between other multicomponent materials being pumped. In this embodiment, gear pumps 62 and 64 are driven at the same speed, and therefore driven by a single motor without a reduction or step up in gearing between the motor and the gear pumps. Thus, the torque which can be imparted to each gear pump can be readily determined for proper design and operation.

In one embodiment of invention, appropriate gearing is provided such that a standard 1750 rpm electric motor is used, driving gear assemblies 154 and 160 at approximately 140 rpm. A two speed motor can be used wherein the motor speed can be reduced to 1150 rpm, resulting in a rotation speed of the gear assemblies to approximately 90 rpm.

Although in the preferred embodiment shown, the gear pumps 62 and 64 are driven at the same speed, it will be appreciated by those skilled in the art that various gear reductions and the like may be used to vary the rotational speed of the gear pumps to provide different ratios of flow of the various materials. Such an arrangement is shown in FIG. 7 wherein variation in the diameter of sprockets 74 and 76 may be incorporated to produce a different rotation speed in pump 62 from that in pump 64. This change in rotation speed may of course be made by other transmission devices not shown, but with the same end result of producing a system with different speeds of rotation to either compensate for different viscosities of material or to pump different ratios of material as desired. Likewise, it will be appreciated by those skilled in the art that more than two gear pumps may be used where multiple component materials are being pumped. In this arrangement, either one or more motors may be used to drive the multiple gear pumps to pump the various components prior to mixing and application of such components.

Figure 9:
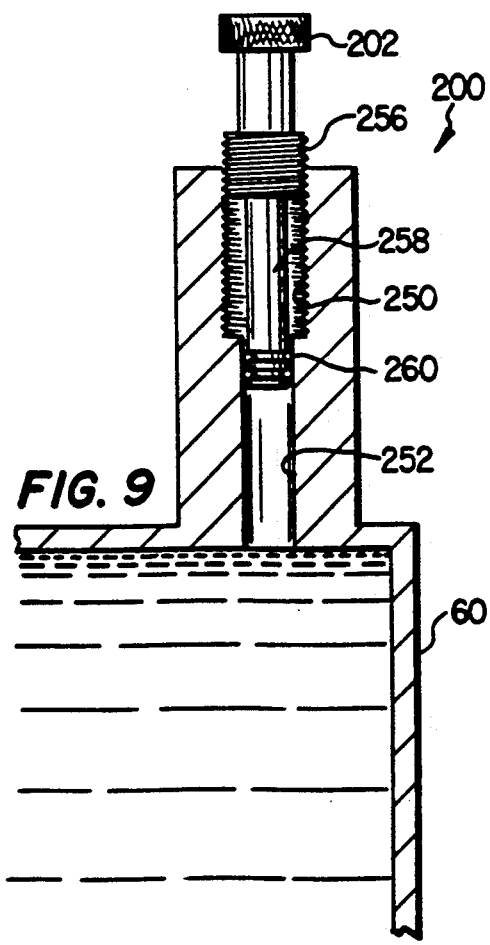
FIG. 9 is an enlarged section view of the pump housing plug used in the present invention.

Referring now to FIGS. 2 and 9, pump housing 60 has threaded inlet 200 for receiving a plug 202. Inlet 200 has a threaded bore 250 with a reduced bore 252 therebelow. Plug 202 has external threads 256 which mate with threads 250 and an extended shaft 258 having an 0-ring 260 fitted in an annular groove near its end. 0-ring 260 has an external diameter such that a seal is formed between the interior wall of bore 252 and shaft 258. As can be seen in FIG. 9, insertion of plug 202 into inlet 200 causes a seal to be formed by 0-ring 260 between the interior bore 252 of the inlet and shaft 258.

The housing is completely filled with lightweight oil such that pumps 62 and 64 are submerged in oil at all times. The oil within gear pump housing 60 is slightly under pressure by virtue of filling the housing completely and then reducing the volume of the housing by inserting threaded plug 202 into inlet 200. During operation of pumps 62 and 64, the pumps also act under an internal pressure which is generated by operation of the pumps (FIG. 3) causing slight movement of the pressure compensation seal 230 on the shaft 158 until a pressure balance is achieved between the interior pressure of the pump and the external pressure of the oil included in pump casing 60. This pressure balance prevents the seepage of components out of the gear pump as well as the seepage of oil into the gear pump. However, by submerging pumps 62 and 64 within oil, the likelihood of introduction of air into the pumps, and thus air contamination of the materials being pumped by air, is avoided. Air which is brought into the system with the components being pumped migrates out of the system, and in fact is pressurized out of the system, by the internal pressure of the pump along the upward section of shaft 158 of gear section 156, moving out of the pump housing at seal 230 around shaft 158. Thus, air is effectively kept out of the system and is effectively removed from the system during operation.

FIG. 8 shows heater assembly (also FIG. 2) 90 in detail, heater assembly 92 being identical thereto. Heater 90 assembly includes an aluminum core 270 having a bore therein for receiving a heat rod 272 centrally therein. Core 270 has an externally spiraled groove 274 formed therearound which receives a stainless steel pipe 276 therein. Pipe 276 is connected on its lower end by an appropriate fitting to discharge hose 40 from pump 62 and at its exit end to the continuation of hose 40. A temperature sensor 280 is positioned adjacent pipe 276 and is connected by an appropriate electrical lead 288 to controller 102. A similar lead 290 is connected between heater assembly 92 and controller 102. An aluminum epoxy shell 294 is formed around core 270 and pipe 276 with a foam insulation 282 formed thereover. Heat rod 272 is connected by an appropriate lead 104 to controller 102 (FIG. 2) as referred to hereinabove. Lead 106 similarly connects to controller 102.

Figure 10:
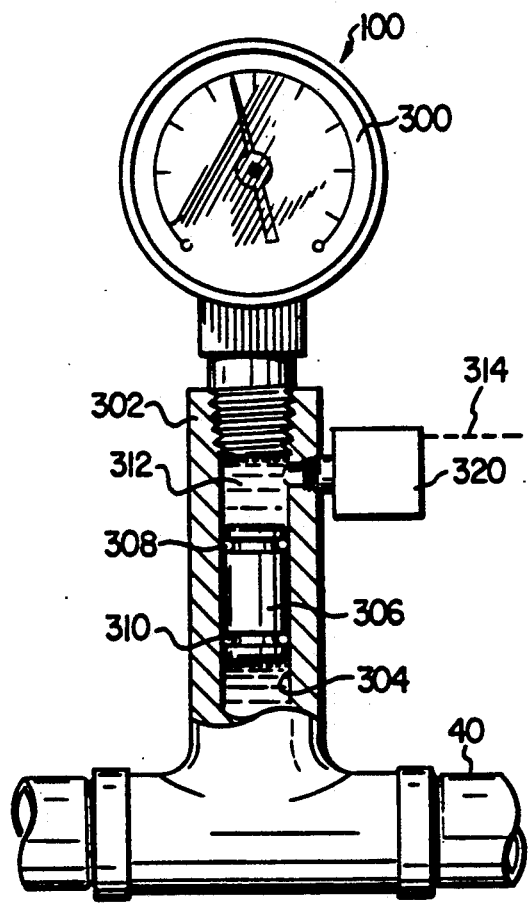
FIG. 10 is an enlarged section view of the pressure gauge structure used in the present invention.

FIG. 10 illustrates pressure sensor 100 in detail, sensor 101 being identical thereto. Referring to FIG. 10, sensor 100 includes an appropriate gauge 300 which has a threaded connection for engagement within a connector sleeve 302 having an appropriate cylinder 304 formed therein. Sleeve 302 is connected by an appropriate connection to chemical hose 40 as shown. A movable piston 306 is received within cylinder 304 of sleeve 302 and has an upper oil seal 308 and a lower chemical seal 310 thereon. Both seals form a fluid seal between cylinder 304 and chamber 312. Hydraulic oil is loaded within the chamber 312 defined above piston 306 and thus communicates with pressure gauge 300. Thus, chemical below piston 306, which applies a pressure within hose 40, applies a pressure on piston 306. This pressure is communicated by piston 306 on hydraulic oil in chamber 312 to gauge 300 wherein the pressure in base 40 is then read.

In this way, chemical is not directly communicated to gauge 300. Because of the chemicals normally used in these systems, exposure of pressure gauge 300 to such material would result in short term if not immediate failure or malfunction. The present system isolates the gauge from the chemical while permitting the reading of the pressure for use in controlling the present system. A safety switch 320 is mounted on sleeve 302 and reads pressure in chamber 312. Switch 320 is connected by lead 314 (FIGS. 2 and 10) to controller 102. Pressure switch of assembly 101 is similarly connected to controller 102 by lead 316 (FIG. 2). This safety switch functions to shutdown the system, that is, terminate operation of motor 70, upon sensing a predetermined pressure.

Although the above system, the operation of which is described below, is designed for the pumping of dual component materials and the subsequent spraying of such materials, it will be appreciated that the present invention is not limited to applications of material by spraying. Other types of applicators may be used depending upon the particular material being applied. For example, the present system may be used for mixing multicomponent materials which are used to form packaging insulation. Thus, an applicator necessary to combine the materials and discharge them into a void or other desired area may be used. Further, the present system may be used to apply a multicomponent material onto a surface to form a sheet material. In this case, an applicator other than a spray device may be used.

Referring to the embodiment illustrated in the drawings, operation of the apparatus of the present invention is as follows. For pumping a polyurethane foam, polymeric isocyanate is loaded into collapsible receptacle 30 and an appropriate resin is loaded into receptacle 32. These materials are delivered to the suction ports of pumps 62 and 64, respectively, by way of hoses 34 and 36. Activation of electric motor 70 by the operator, using switch 110, rotates sprocket 82 which in turn rotates sprockets 74 and 76 of the gear pumps, driving the gear sections of the corresponding pumps. This rotation draws the component materials into the suction side of the pump and discharges the materials through the pressure ports in the pumps. The fluids then pass through check valves 96 and 98 and adjacent heater elements 90 and 92, respectively, and then to spray gun 44.

When sufficient pressure has been developed in the hoses, the operator engages switch 220 which opens gun 44 and allows the spraying of material therefrom. Gun 44 is actuated by way of air supplied thereto through hose 48. The present system includes pressure gauges 100 and 101 in hoses 40 and 42, respectively, and these gauges are connected by appropriate leads to controller 102 to prevent excessive build up of pressure in the hoses. When maximum pressures are reached, the controller automatically shuts off motor 70.

The present system is unique in that it permits independent operation of motor 70 and actuation of gun 44. Thus, where a smaller amount of material is to be sprayed or applied, the operator can actuate valve 220 prior to developing maximum pressure in hoses 40 and 42. Likewise, the operator may bleed down pressure by actuating switch 220 without driving motor 70. Thus, a precise amount of foam may be developed by virtue of these independent controls. Of course, the system may be set up such that maximum pressure is maintained by the automatic actuation of motor 70 with the spraying of material being accomplished by use of a single switch, such as 220, for discharge of material.

The rotation of pumps 62 and 64 is instantaneous, and therefore the pressure to gun 44 builds immediately to a pumping pressure of approximately 1100 psi. Upon deactivation of switch 110, the rotation of pumps 62 and 64 is stopped. However, check valves 96 and 98 maintain pressure within the lines 40 and 42 to gun 44. Thus, when the operator is again ready to continue spraying, working pressure exists in the pressure lines and by merely actuating switch 110, simultaneously with spray gun control switch 220, a perfect spray is achieved. Likewise, accurate metering of material through pumps 62 and 64 is achieved by virtue of the proper setting and design of the pumps for the particular material being sprayed. Thus, it has been found that the present system, even when built as a portable system, may easily pump 0 to 8 pounds of foam per minute, maintaining precise metering accuracy of the two components necessary in the spraying process.

Although the system may be build as a portable system, it will likewise be recognized that these components may be easily made to pump extremely large quantities of material. Indeed, the system may be designed to pump 1,000 pounds per minute or more as is dictated by the specifications of a particular job.

Likewise, more than two components may be sprayed by adding an additional gear pump, heaters, sensors, check valves and other described components, and the necessary drive mechanism from motor 70 to rotate the pump as required. In addition to varying the lead clearance between the gears and the gear housing, different gear speeds may be achieved by an appropriate gear transmission which can be interconnected between motor 70 and the gear pumps.

Thus, the present invention provides a method and apparatus for precisely metering and pumping multi-components of high and low viscosity materials, such as an organic resin coating for subsequently mixing and applying such mixture. The material may be applied by spraying or may be deposited into a container or other void as necessary for the particular application desired. The system includes the use of a gear pump for each component. Each gear pump has gears rotating in a gear housing for receiving and pumping one of the components. The gear pumps are simultaneously driven at a predetermined speed and each gear pump is designed to pump a predetermined amount of its respective component, at the predetermined speed. By controlling the clearances between the gears in the gear pump and their respective housing, the gear pumps are designed to pump precise amounts of the material discharged from the pump to maintain an appropriate ratio of materials as needed. This is accomplished, even though the various materials pumped may have different viscosities, by using different leads and clearances between the gears and the gear housings so that desired proportions of the components are pumped.

Because the present design uses an electric motor of low voltage and low amperage, the system is readily adaptable for portable use. Further, spraying pressures may be instantaneously produced because of the design and use of positive displacement gear pumps rather than piston pumps, in conjunction with check valves for maintained pressure to the spray gun between use. Of course, prime movers other than an electric motor may be used to drive the gear pumps. For example, a hydraulic motor may be substituted for the electric motor.

Figure 11A:
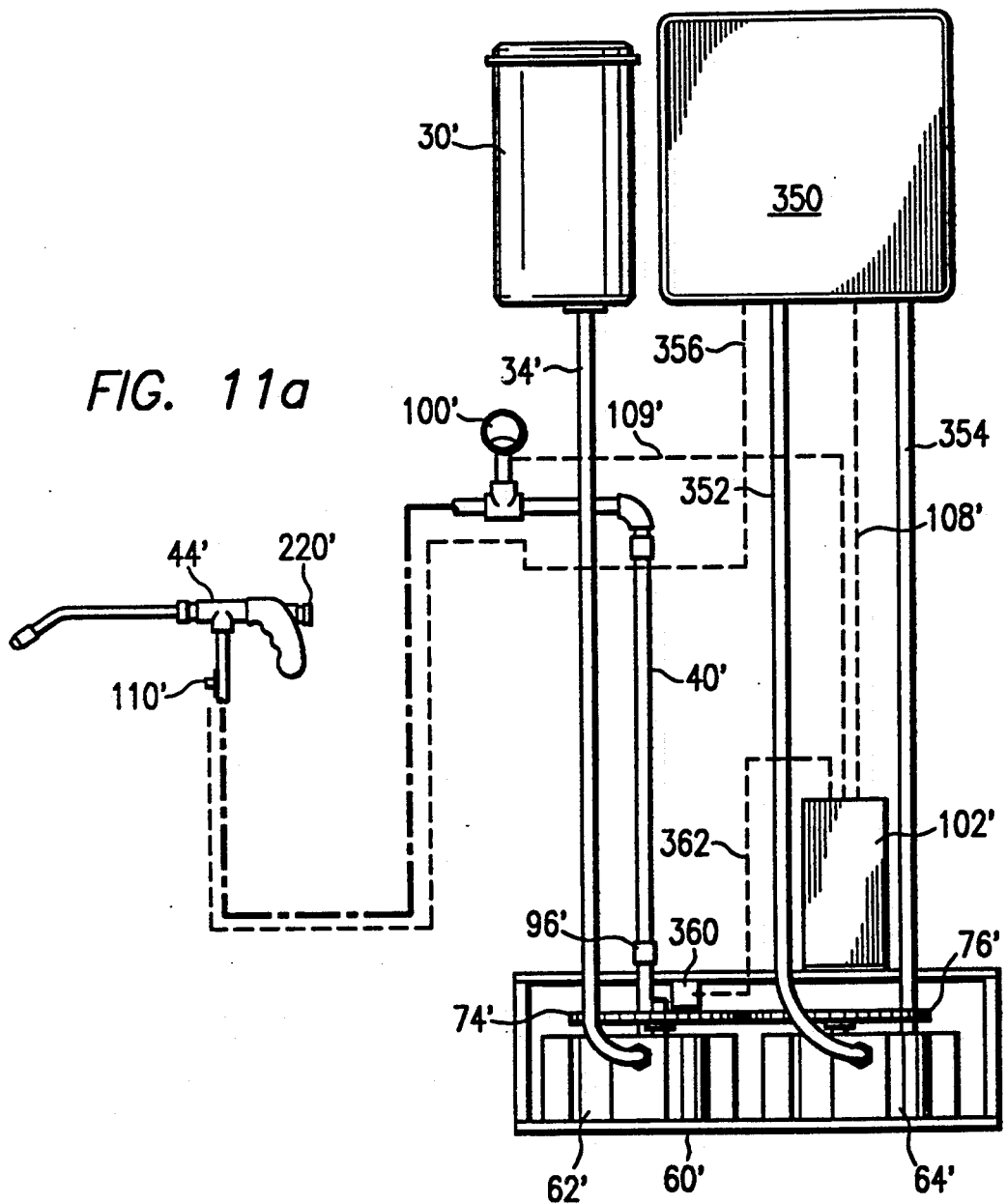
FIGS. 11a, 11b and 12 are alternative embodiments of the invention for pumping a single fluid.

The present invention may also be advantageously used to pump a single fluid. FIG. 11a shows the adaptation of the present invention to pump a single fluid within a wide range of viscosities. The embodiment of FIG. 11a will be described as it is applied to pump a material, such as oil, although it will be readily understood that any type of material, whether having a low, intermediate of high viscosity may be very accurately pumped by the present invention.

In the embodiment of FIG. 11a, because components similar to those incorporated in the embodiment of FIG. 2 may be used, the same number is applied to such corresponding components, with the exception that a "prime" designation is added thereto.

Referring now to FIG. 11a, a fluid supply tank 30' is connected by a supply line 34' to the inlet of a single gear pump 62'. A discharge line 40' is connected from a discharge in gear pump 62' to a dispenser gun or similar apparatus 44'. Line 40' has a check valve 96' connected therein adjacent to the discharge of gear pump 62'. This check valve allows fluid to flow into line 40' but not from line 40' back into gear pump 62'. Dispenser gun 44' has a hand actuated valve 220' which permits the selective discharge of fluid through the dispenser gun.

Sprocket 74' is positioned exteriorly of gear pump 62'. A torque motor 64' is positioned adjacent to gear pump 62' and has a sprocket 76' extending exteriorly thereof and in driving engagement with sprocket 74' of gear pump 62'. Both gear pump 62' and torque motor 64' are housed within a housing 60' which is filled with fluid, such as oil, to balance pressure exerted from the interior of gear pump 62' and torque motor 64' as is described with respect to the primary embodiment of the invention illustrated in FIGS. 1 through 10. As a result, leakage from gear pump 62' and torque motor 64' around the shaft with which sprockets 74' and 76' rotate is prevented.

Torque motor 64' is fed by a hydraulic fluid supply system 350 which supplies hydraulic fluid under pressure through conduit 352 to torque motor 64'. Such fluid is exhausted from torque motor 64' through exhaust line 354 which recirculates the fluid to hydraulic fluid source 350. Hydraulic fluid source 350 may be one of any number of standard systems for supplying hydraulic fluid under pressure to torque motors. Hydraulic fluid source 350 has a controller therein which is connected by electrical lead 356 to control switch 110' on discharge gun 44'. Discharge of fluid through gun 44' is controlled by operator switch 220'. A pressure sensing unit 100' is positioned within line 40'. An appropriate controller 102' is connected by an appropriate lead 108' to the hydraulic fluid source controller. Controller 102' is also connected by appropriate electrical lead 109' to pressure gauge 100'.

The structure of gear pump 62' may be substantially identical to that shown in the first embodiment as specifically described with respect to FIG. 3 and FIG. 3a. However, the pump is designed to achieve a relatively high pumping efficiency. Therefore, the specific structure of such gear pump will not be detailed here. Similarly, torque motor 64' may have a structure similar to that shown with respect to gear pump 64 in the first embodiment, described with respect to FIG. 3, but with a relatively high pumping efficiency. The operation of the pump when pumping a single fluid is as follows. On initial start-up, the operator engages switch 110' which energizes hydraulic fluid supply 350. This in urn delivers hydraulic fluid under pressure to torque motor 64' which in turn rotates gear pump 62' by way of sprockets 76' and 74'. Upon rotation of gear pump 62', fluid is drawn into the pump from supply tank 30' and discharged past check valve 96' and through discharge hose 40' to gun 44'. As soon as sufficient pressure is accumulated in the line as indicated by pressure gauge 100', the operator may discharge a desired amount of fluid by simply actuating switch 220'. Also, controller 102' acts to prevent excessive buildup of pressure in the line by shutting off the fluid supply to torque motor 64' as soon as a predetermined pressure limit has been reached. Such control is achieved by controller 102' reading pressure measured at gauge 100' and controlling the hydraulic fluid provided to torque motor 64'. However, it will be noticed that even though torque motor 64' is shut off, pressure is maintained in hose 40' by check valve 96'. Thus, an instantaneous supply of fluid is always provided at gun 44' by simply engaging switch 220', without the need of operating gear pump 62' continuously. Rather, as soon as fluid is drawn out of the line as sensed by pressure gauge 100', controller 102' actuates hydraulic fluid supply 350 to again drive torque motor 64'.

It will be noticed that the embodiment of FIG. 11a can be easily achieved from the structure of the first embodiment, namely that specifically shown in FIGS. 2 and 3. By simple conversion of a very few elements, the side-by-side gear pumps can be converted such that one acts as a torque motor to drive the other, which acts as a fluid pump. In this case, precise control can be achieved.

Figure 11B:
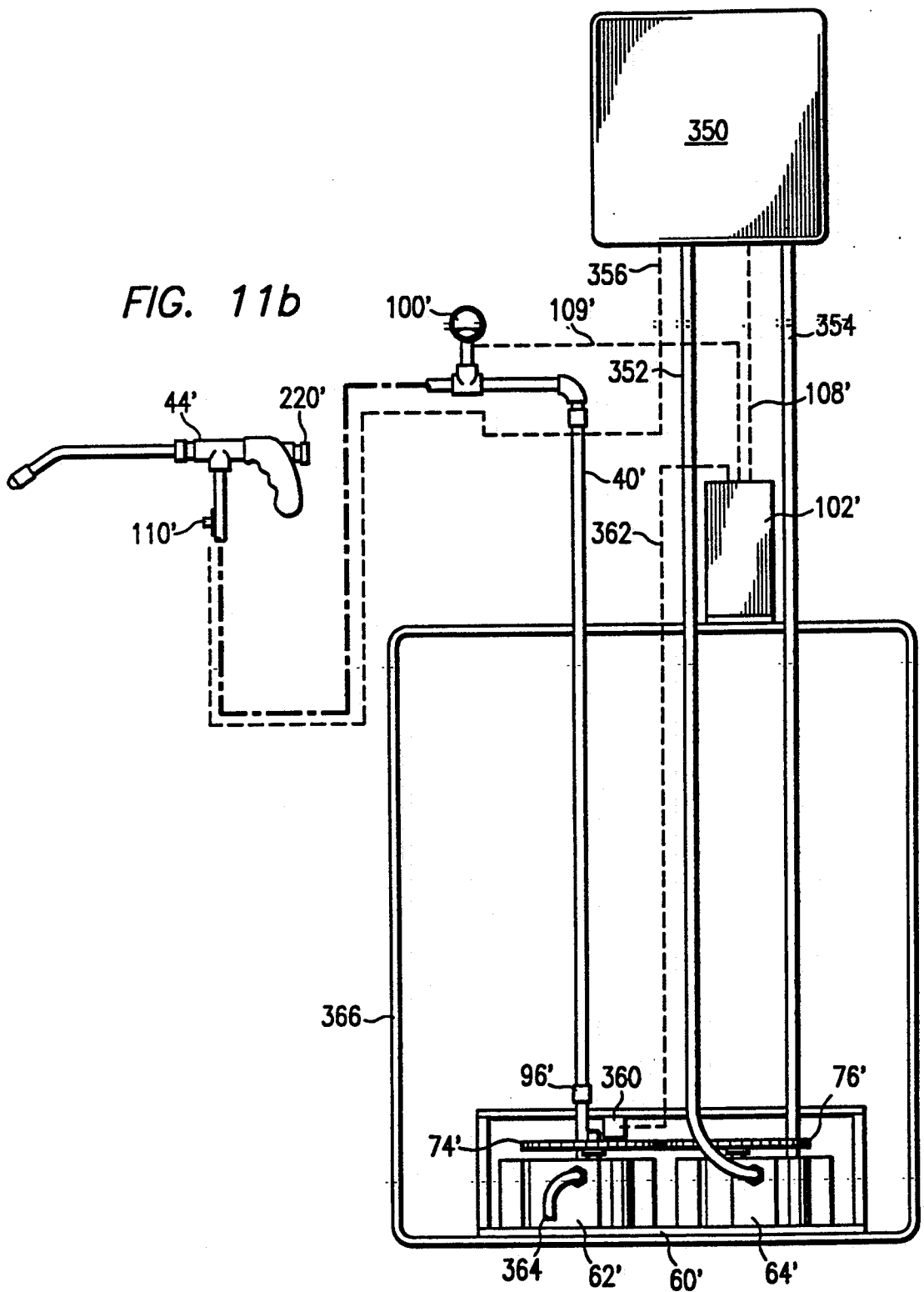

In yet another embodiment of the invention, illustrated in FIG. 11b, the assembly comprised of pump 62', torque motor 64', and pump chamber 60' may be submerged in the fluid being pumped by the system contained in supply tank 366. In this arrangement, the suction or supply line 364 opens directly into tank 366. Further, by placing the assembly in the lower portion of supply tank 366, a head of suction is continuously provided to the system.

It will be appreciated that this arrangement is made possible in view of the complete seal which is provided by pump chamber 60' and the associated seals 230, described earlier with respect to the embodiment of FIG. 3. By incorporating such seals and pressurizing fluid within chamber 60', contamination of hydraulic fluid used to drive the torque motor into the pumped fluid is prevented. Thus, for example, where materials such as oil or antifreeze are being pumped, there is no possibility of contamination of such fluid by the hydraulic fluid which is used to drive torque motor 64'. Without the positive sealing arrangement which is disclosed in the present invention, such an arrangement would not be possible.

Figure 12:
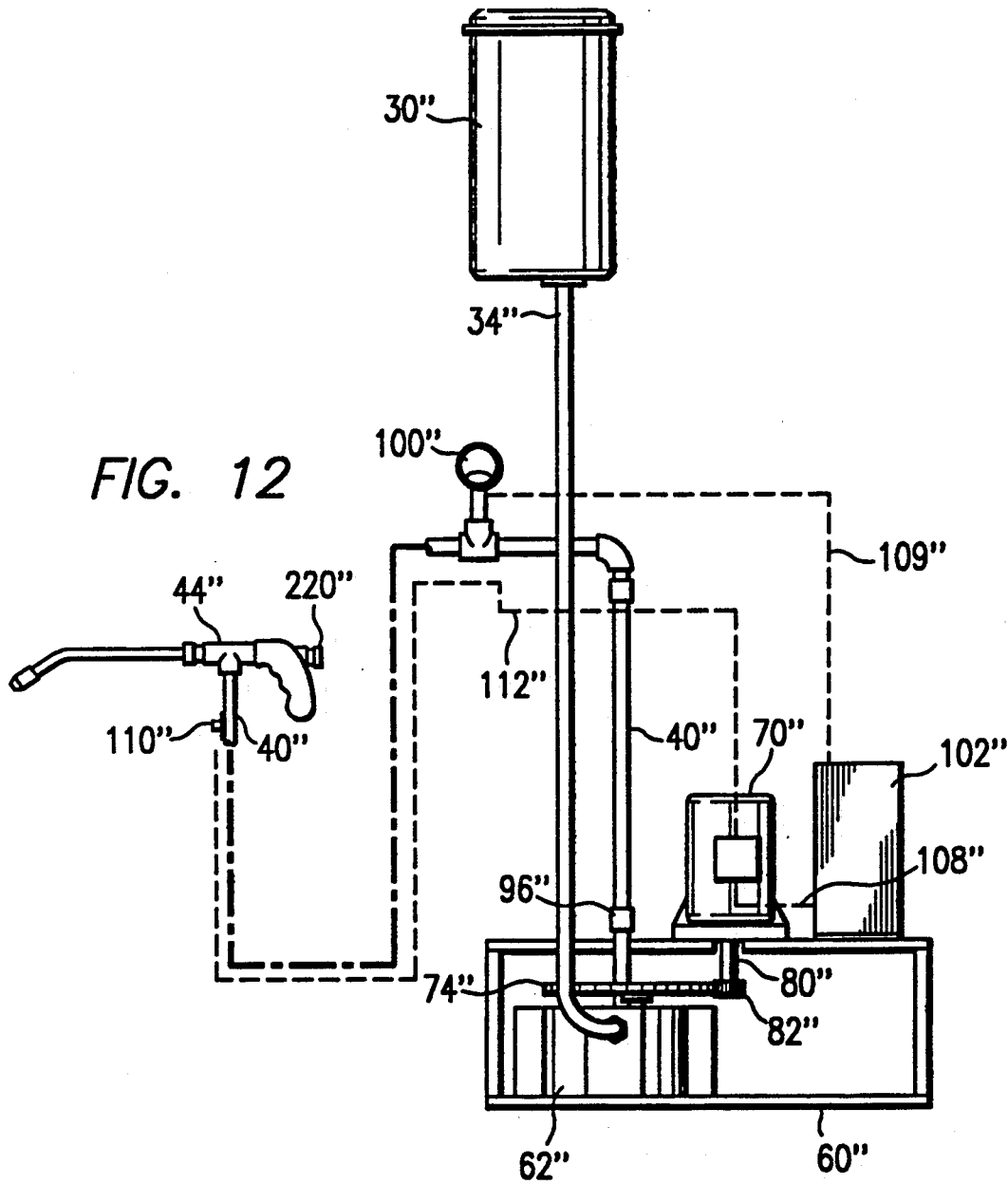

In yet another embodiment shown in FIG. 12, an electric motor rather than a torque motor may be used to drive a single gear pump used to discharge a fluid. In the embodiment of FIG. 12, because components similar to those incorporated in the embodiment of FIG. 2 and the embodiment of FIG. 11 may be used, the same numbers are applied to such corresponding components but with the addition of a "double-prime" designation added thereto. Referring now to FIG. 12, a supply tank 30" is connected by way of supply line 34" to an inlet in single gear pump 62". A discharge line 40" is connected from a discharge in gear pump 62" to a dispenser gun or similar apparatus 44" attached to the end thereof. Line 40" has a check valve 96" connected therein adjacent to the discharge of gear pump 62". This check valve allows fluid to flow into line 40" but not from line 40" back into gear pump 62". Dispenser gun 44" has a hand actuated valve 220" which permits the release of fluid being pumped therethrough upon demand.

Sprocket 74" is positioned exteriorly of gear pump 62" and is engaged by a motor sprocket 82" attached to shaft 80" extending from and driven by motor 70". Motor 70" is mounted relative to gear pump 62" by an appropriate support structure as shown.

Motor 70" is connected to control switch 110" on discharge gun 44" by an appropriate electrical lead 112". Discharge through gun 44" is controlled by operator switch 220". An appropriated pressure gauge 100" is positioned within line 40". An appropriate controller 102" is connected by an appropriate lead 108" to motor 70" and by another lead 109" to pressure gauge 100".

The structure of gear pump 62" may be identical to that of gear pump 62 shown in the first embodiment and described with respect to FIGS. 3 and 3a, but with the pump designed to achieve a relatively high efficiency. Therefore, the specific structure of such gear pump will not be described here. The operation of the pump when pumping a single fluid is as follows. On initial startup, the operator engages switch 110" which energizes pump 70" to drive gear pump 62". Upon rotation of gear pump 62", fluid is drawn into the pump from supply tank 30" and discharged past check valve 96" and through discharge hose 40" to dispenser gun 44". As soon as sufficient pressure has accumulated in the line, as indicated by pressure gauge 100", the operator may discharge a desired amount of fluid by simply actuating switch 220". Also, controller 10" acts to prevent excessive build-up of pressure in the line by shutting off motor 70" as soon as a pressured limit has been reached. Such a control is achieved by controller 102" reading pressure measured by gauge 100" and controlling motor 70" in response thereto. As in the embodiment of FIG. 11, with motor 70" shut off, and pressure built-up in the line to a desired level, pressure is maintained in hose 40" by check valve 96". Thus, an instantaneous supply of fluid is always available by simply engaging switch 220", without the need of operating gear pump 62" continuously. Rather, as soon as fluid is drawn out of the line as sensed by pressure gauge 100", motor 70" is again actuated to drive gear pump 62".

Referring to the embodiments in FIGS. 11 and 12, by use of a gear pump, such as gear pump 62' or 62", metering of fluid can be precisely maintained by simply controlling and recording the cycles of rotation of the drive motor (whether hydraulic or electric), to thereby control the rotation of the gears in the gear pump. This control can be used to both dispense and monitor the dispensing of fluid through gun 44' or 44". For example, a rotation counter 360 (FIG. 11a) can be provided to read and record rotation of shaft 158' of gear pump 62'. Output from counter 360 is communicated to controller 102' by way of electrical lead 362. From rotation of the gear pump shaft, the precise quantity of fluid pumped can be controlled and recorded. Further, supply of fluid from the gun is instantaneous upon engagement of switch 220' or 220", and such instantaneous pumping of fluid is achieved without the steady operation of any pump or motor in the system.

Although a preferred embodiment of the invention has been described in the foregoing detailed description and illustrated in the accompany drawings, it will be understood that the invention is not limited to the embodiment disclosed, but is capable of numerous rearrangements, modifications, and substitutions of parts and elements without departing from the spirit of the invention. The present invention is therefore intended to encompass such rearrangements, modifications and substitutions of parts and elements as fall within the spirit and scope of the invention.

I claim:

1. A system for pumping a fluid comprising:
   a gear pump having two or more gears operating in a gear housing for receiving and pumping said fluid,
   a discharge line from said pump for receiving said pumped fluid,
   a dispenser connected on said line for selectively discharging fluid pumped through said line when said dispenser is in its opened position, and
   a torque motor for driving said gear pump,
   a closed chamber substantially enclosing said gear pump and said torque motor containing pressurized noncompressible fluid, said chamber being fully submerged within the fluid being pumped.

2. The system according to claim 1 further comprising control means for operating said gear pump only as necessary to maintain a predetermined pressure in said line.

3. The system according to claim 1 wherein said gear pump has a shaft extending externally from said housing and rotating with said gear pump gear and has a sprocket thereon for driving engagement with a sprocket attached to a shaft extending externally of said torque motor, and
   wherein said pressurized non-compressible fluid surrounds the portion of the gear pump and torque motor from which the shafts of said gear pump and torque motor extend.

4. The system according to claim 1 further comprising:
   means for maintaining said non-compressible fluid under pressure.

5. A system for pumping a fluid comprising:
   a gear pump for pumping said fluid, said gear pump having a gear rotating on a shaft in a gear housing for receiving and pumping the fluid,
   a motor for driving said pump, said drive motor having a shaft extending therefrom for driving engagement with the shaft of said gear pump,
   a chamber surrounding said gear pump, said drive motor and the engaging shafts extending therefrom, said chamber containing pressurized oil therein and being submerged in the fluid being pumped, and
   an applicator for receiving said fluid through a hose from said pump and for discharging said fluid 6. The system according to claim 5 wherein said drive motor is a torque motor and said shaft extending therefrom has a sprocket thereon for driving engagement with said sprocket attached to a shaft of said gear pump, and wherein said pressurized oil is filled adjacent the gear pump and torque motor where the shafts of the gear pump and torque motor extend.

7. The system according to claim 5 further comprising:
   control means for operating said gear pump only as necessary to maintain a predetermined pressure in said hose.

* * * * *